United States Patent Office 2,970,119
Patented Jan. 31, 1961

2,970,119

POLYESTER-URETHANES DERIVED FROM DI-ALKYLMALONIC COMPOUNDS AND TEXTILE FABRIC COATED THEREWITH

John R. Caldwell, Kingsport, Tenn., assignor to Eastman Kodak Company, Rochester, N.Y., a corporation of New Jersey No Drawing. Filed Feb. 21, 1958, Ser. No. 716,552

17 Claims. (Cl. 260—2.5)

This invention relates to a process for preparing a polyester-urethane comprising reacting together (1) a hydroxyl-terminated polyester having a molecular weight below about 5000 principally prepared from bifunctional reactants including a dicarboxylic compound and a glycol, said polyester preferably having a hydroxyl number of from 30 to 140 and an acid number of from 0 to 15 and a weight average molecular weight of from about 700 to about 3500, and (2) at least one organic polyisocyanate, containing at least 50 mole percent of a diisocyanate, said reacting being accomplished with agitation and curing the reaction mixture in a shape determined by the space in which it is contained at about 50°–140° C. In particular, this invention provides an improvement in such a process consisting of employing as at least 50 mole percent of said dicarboxylic compound, a 2,2-dialkylmalonic compound.

Moreover, this invention provides a further improvement which consists of employing, as at least 50 mole percent of said glycol, a glycol having at least one ether moiety in its structure. In addition, this invention relates to the improved elastomers, foams and other products produced.

Although the hydroxyl-terminated polyesters described above are preferred in preparing foams using water to form carbon dioxide, a similar effect can be achieved by using carboxyl-terminated polyesters without water; however, the latter type are rather difficult to prepare from dialkylmalonic acids since they tend to decarboxylate at the high temperatures ordinarily used during polyesterification.

It is an object of this invention to provide polyester-urethanes that have improved resistance to hydrolysis. It is a further object of this invention to provide polyester-urethanes that have improved properties at low temperatures.

An additional object is to provide new polyester-urethanes which contain improved properties contributed by ether linkages and at the same time have improved resistance to hydrolysis.

Another object of this invention is to provide polyesterurethanes that are of particular value as rubber substitutes, foamed plastics, adhesives, protective coatings, fabrics, fibers, films, molding compositions, textile treating materials, etc.

This invention does not relate to simple polyesters made from dialkylmalonic compounds condensed with a glycol nor to simple polyurethanes. This invention relates only to block polymers which contain polyester block units connected by reaction with polyisocyanates to form urethane linkages between the blocks.

The generic character of this invention is set forth in the first paragraph of this specification. More specifically, this invention provides, among other things, an improved process for preparing an elastomeric polyester-urethane made by the following general procedure comprising (A) reacting together at least the following ingredients (1) a liquid polyester principally prepared from bifunctional reactants including at least one dibasic carboxylic compound containing at least 3 carbon atoms and at least one glycol, said polyester having a hydroxyl number of from 30 to 140 and an acid number of from 0 to 15 and a weight average molecular weight of from about 700 to about 3500, and (2) at least one organic polyisocyanate, containing at least 50 mole percent of a diisocyanate, the ratio of the equivalents of said polyester based on its hydroxy content to the equivalents of said polyisocyanate being from about 0.85 to about 1.10, said reacting being accomplished with agitation for a short period of time, and (B) curing the reaction mixture in a shape according to the space in which it is contained at about 50°–140° C. The improvement provided by this aspect of the invention consists of employing as at least 50 mole percent of said dicarboxylic compound, a 2,2-dialkylmalonic compound. Moreover, this invention also provides a further improvement which consists of employing, as at least 50 mole percent of said glycol, a glycol having at least one ether moiety in its structure.

According to one specific embodiment, said dicarboxylic compound is diethyl 2,2-dimethylmalonate, said glycol is diethylene glycol, and said polyisocyanate is m-tolylenediisocyanate. According to another specific embodiment, said dicarboxylic compound is diethyl 2-ethyl-2-methylmalonate, said glycol is pentamethylene glycol and said polyisocyanate is 1,6-hexamethylenediisocyanate. Other specific embodiments will also be apparent.

This invention also provides as a more specific aspect of the invention, a process for preparing polyester-urethane foam made by the following general procedure comprising (A) reacting together at least the following ingredients (1) a liquid polyester principally prepared from bifunctional reactants including at least one dibasic carboxylic compound containing at least 3 carbon atoms and at least one glycol, said polyester having a hydroxyl number of from 30 to 140 and an acid number of from 0 to 15 and a weight average molecular weight of from about 700 to about 3500, (2) at least one organic polyisocyanate, comprising at least 50 mole percent of a diisocyanate, the equivalents of said polyester based on its hydroxyl content to said polyisocyanate being from about 2.5 to 5.0 and (3) water, there being from 0.8 to 1.5 equivalents of water for each equivalent of said polyisocyanate in excess of the equivalents of said polyester, said reacting of (1), (2) and (3) being accomplished with agitation for a short period in the presence of an emulsifier composition so as to form a foamed liquid, (B) allowing the foamed liquid reaction mixture to form a solid foamed product shaped according to a space in which it is contained, and (C) curing the foamed product at 50°–100° C. The improvement provided by this aspect of the invention consists of employing, as at least 50 mole percent of said dicarboxylic compound, a 2,2-dialkylmalonic compound. Moreover, this invention also provides a further improvement which consists of employing, as at least 50 mole percent of said glycol, a glycol having at least one ether moiety in its structure. According to a specific embodiment said dicarboxylic compound is dimethyl 2-ethyl-2-butylmalonate and said glycol is 4,4'-oxydibutanol. Other specific embodiments will also be apparent.

As already made evident, the objects of the invention are accomplished by treating certain types of low-molecular-weight polyesters with polyisocyanates. The low-molecular-weight polyester is derived from a dialkylmalonic compound such as the acid, ester or acid halide condensed with a glycolic compound which may include esters of such glycolic compounds. In an especially advantageous aspect of the invention the glycol can contain one or more ether linkages. The products of the invention are useful as rubber substitutes and can be used for the manufacture of automobile tire treads. Since such elastomeric polyester-urethanes have excellent resistance to solvents, they can be used as gaskets and packing materials. An important property of the new polyurethanes provided by this invention, especially those made from ether glycols, is their flexibility at low temperatures. They retain their toughness and rubbery qualities at temperatures as low as —40° to —60° C.

A very important property of the new polyester-urethanes provided by this invention is their resistance to hydrolysis. It is well known that polyesters made from aliphatic dicarboxylic acids such as succinic, adipic, etc. are very readily hydrolyzed and polyester-urethanes made from such polyesters are also subject to hydrolysis. This is especially true for polyesters made from ether glycols such as diethylene glycol. Hence, it was quite unexpected to find that polyesters made from dialkylmalonic acids could be used in the preparation of polyester-urethanes which have greatly improved resistance to hydrolysis. It is thus apparent that the polyester-urethanes provided by this invention represent an important advance in the art. They combine good low temperature properties with improved resistance to hydrolysis as well as many other valuable properties such as excellent resistance to solvents, etc.

The production of polyester-urethanes, elastomers, foams and the like is described in numerous patents and in the literature. Reference is made to Angew. Chem., 62, 57–66 (1950); 64, 523–31 (1952). See also Modern Plastics, June 1947, page 149. It is not believed appropriate or necessary to indulge in a lengthy discussion in this specification as to the various details which can be employed in the preparation of polyester-urethanes of the type with which this invention is concerned. As has been indicated above, this invention relates, so far as the process is concerned, to the important contribution of a dicarboxylic compound, namely, a dialkylmalonic compound, which can be used so as to produce polyester-urethanes having unexpectedly advantageous properties. Of course, the prior art contains teachings that dicarboxylic compounds in general can be used in such processes. This invention resides to a large measure in the selection of a particular small group of such dicarboxylic compounds whereby polyester-urethanes are obtained which have remarkably advantageous properties which could not have been predicted by those having ordinary skill in the art.

A preparation of the polyesters used in accordance with this invention is adequately described in copending application S. N. 662,972, filed June 3, 1957, entitled "Polymeric Plasticizers from Dimethylmalonic Acids." The polyesters used may contain other dicarboxylic acids but should contain at least 50 mole percent of a dialkylmalonic acid. In some cases it is advantageous that the polyesters contain a minor amount of an alcohol that contains 3 or more hydroxyl groups. Suitable examples of such polyhydric alcohols includes glycerine, pentaerythritol, trimethylolpropane, trimethylolethane, etc. In most cases from 5 to 25 mole percent of the polyhydric alcohol can be advantageously employed when it is desired to produce polyester-urethanes in accordance with this invention which have properties attributable to the presence of cross-linking components. Such properties include further improvements in the resistance to solvents.

Glycols which can be employed in the preparation of polyesters are described in the above mentioned copending application. Such glycols can include ethylene glycol, trimethylene glycol, tetramethylene glycol, pentamethylene, hexamethylene, octamethylene, etc. The glycol may contain one or more secondary hydroxy groups as represented by 1,2-propylene, 1,2-butylene, 1,3-butylene, 2,3-butylene, 2,2,4-trimethyl-1,3-pentanediol, etc. Glycols containing one or more ether groups are of particular value as represented by diethylene glycol, triethylene glycol, tetraethylene glycol, dipropylene glycol, 2,2'-oxydibutanol, 4,4'-oxydibutanol, $$HO(CH_2)_3O(CH_2)_2O(CH_2)_2OH$$

and $HO(CH_2)_4OCH_2CH(OH)CH_3$. Polyalkylene oxides such as polyethylene oxide or polypropylene oxide having a molecular weight of 500–2000 and terminated in hydroxy groups may also be used.

The dialkylmalonic acids used in the process have the general formula

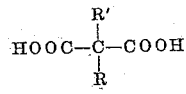

R and R' are alkyl groups containing from 1 to 4 carbon atoms. Suitable examples include dimethylmalonic acid, diethylmalonic acid, methylethylmalonic acid, ethylbutylmalonic acid, and dibutylmalonic acid. A cyclic derivative such as 1,1-dicarboxycyclohexane also is useful; in this case R and R' represent together the five methylene groups necessary to complete a cyclohexane ring.

Since the free dialkylmalonic acids tend to decarboxylate at temperatures above 120° C., it is preferred to use the lower alkyl esters in the preparation of polyesters. The reaction between the ester and glycol is catalyzed by the known ester interchange catalysts such as sodium alkoxides, calcium oxide, litharge, and titanium alkoxides.

The diisocyanates used in the reaction are represented by 2,4-tolylenediisocyanate, hexamethylenediisocyanate, tetramethylenediisocyanate, 4,4'-methylenediphenylenediisocyanate, 4,4'-biphenylenediisocyanate, and decamethylenediisocyanate. Compounds containing three isocyanate groups may also be used. In general, any diisocyanate or triisocyanate can be employed.

The isocyanates may be mixed with the polyesters by means of rolls, Sigma-blade mixers, etc. The ratio of isocyanate to polyester used will depend upon such factors as amount of free hydroxyl group present, molecular weight of the polyester, molecular weight of the isocyanate, type of product desired, etc.

For the production of foamed products, it is desirable to add a small amount of water to the mixture of polyester and isocyanate in order to promote gas formation. Catalysts such as amines, hydroxyamines, salts, etc., can be used.

The polyesters used in the present invention are best prepared from esters of dialkylmalonic acid by ester interchange. A molar excess of 5% to 20% glycol is used, depending upon the molecular weight desired. The larger the excess of glycol, the lower will be the molecular weight of the polyester. The glycol and dialkylmalonic ester are heated, with a suitable catalyst, at 140–180° C. in a vessel equipped with a distillation column. Alcohol is removed through the column while glycol is condensed and returned to the reaction mixture. From 2–6 hr. are required to remove 75–85% of the theoretical amount of alcohol. The temperature is then raised to 190–230° and held for 1–3 hr. to drive out substantially all of the alcohol. A moderate vacuum of 100 mm. is then applied for 1–2 hr. in order to remove the last traces of alcohol. In large scale production, reproducibility from bath to batch is achieved by making analyses for hydroxyl group content, measuring the viscosity of the product at intervals, or measuring the torque on the stirrer during the reaction.

The amount of trifunctional compounds such as trihydroxy glycols and tri-isocyanates determines to a large extent the texture or rigidity of the final product. In general, less than about 5–10 mole percent trifunctional compound tends to give flexible, rubbery products, while more than about 15–25 mole percent tends to give hard, rigid products.

The texture of the products also can be controlled to some degree by the ratio of isocyanate groups to free hydroxyl groups. Flexible, rubbery products are generally obtained when the isocyanate added is approximately equivalent to the free hydroxyl groups in the polyester. That is, there is no substantial excess of isocyanate groups over hydroxyl groups. When excess isocyanate is added, it tends to act as a cross-linking agent, thus increasing the stiffness and rigidity of the product. At levels of 25-40% excess isocyanate, the products are usually classified as "rigid" types.

The references given above describe the production of foamed polyurethane plastics. A detailed description is also given in "Plastics Progress 1955," pp. 81–92. Other references include S.A.E. Journal, 61, 24 (1953); Product Engineering, 26, 140–143 (1955).

The two most important classes of products are the flexible, rubbery materials (for tires, solvent resistant hose, etc.) and the flexible foams (for upholstery, shock absorbers, sound insulation, heat insulation, etc.).

This invention can be further illustrated by the following examples of preferred embodiments although it will be understood that these examples are included merely for purposes of illustration and are not intended to limit the scope of the invention unless otherwise specifically indicated.

Example 1

Ten molecular proportions of diethylene glycol and 9 molecular proportions of diethyl dimethylmalonate were placed in a vessel equipped with a stirrer, a distillation column, and an inlet for purified nitrogen. One-half percent by weight of sodium ethoxide was added as catalyst, and the mixture was stirred at 150–160° C. Ethyl alcohol was removed through the column and the temperature was gradually raised during 1 hour to 180° C. The temperature was then raised to 220° C. and held for 1 hour. A vacuum of 100 mm. was applied and stirring was continued for 1 hour. The product was a viscous oil. It consisted of a low-molecular-weight polyester that was terminated in hydroxyl groups.

This polyester can be mixed with any of the diisocyanates and triisocyanates listed above to give tough, elastic, rubber-like products that retain their flexibility at low temperatures. The properties of the product will depend to some extent upon the particular diisocyanate used, the ratio of diisocyanate to the polyester, and the nature of the catalyst, if one is employed.

In a typical preparation, 25 parts of the polyester was mixed with 4 parts of m-tolylenediisocyanate. The mixing was carried out as rapidly as possible in a sigma-blade mixer at 20–30° C. The mixture was then placed in a mold and heated at 80–100° C. for 1 hour to give sheets 6" x 6" x 1/8".

The sheets had a high tensile strength and retained their flexibility at a temperature of −40° C. The product showed substantially no hydrolysis when boiled in water for 96 hours.

Example 2

The following materials were placed in a flask equipped with a stirrer and a distillation column:

5.7 molecular proportions of pentamethylene glycol
0.3 molecular proportion of 2-hydroxymethyl-2-methyl-1,3-propanediol
5.8 molecular proportions of diethyl methylethylmalonate As an ester interchange catalyst, 0.2% by weight of calcium oxide was used. The mixture was stirred at 180–200° C. and ethyl alcohol was distilled through the column. When the distillation had practically ceased, the temperature was raised to 200° C. and held for 1 hour. A vacuum of 100 mm. was applied and stirring was continued for 2 hours. The product was a viscous oil. It consisted of a low-molecular-weight polyester that contained free hydroxyl groups.

Five parts of the polyester was rapidly mixed with one part of hexamethylenediisocyanate and the mixture was poured on a plate to give a film. The film was heated at 120° C. in a dry atmosphere for 1 hour. It had a high tensile strength and retained its flexibility at a temperature of −60° C. This product showed substantially no hydrolysis after boiling in water for 96 hours.

Example 3

Using the general procedure described above, a polyester was made from the following materials:

5.0 moles dimethyl ethylbutylmalonate
5.4 moles 4,4'-oxydibutanol
0.3 mole 2-hydroxymethyl-2-methyl-1,3-propanediol One hundred parts of the polyester was rapidly mixed with 35 parts of tolylenediisocyanate, 1 part of N-ethylmorpholine, and 3 parts of water. The mixture was poured into a mold. It expanded to give a foam having a volume about 10–12 times the volume of the original mixture. The foam retained its flexibility at −40° C. and showed excellent resistance to hydrolysis.

Example 4

Using the general procedure described above, a polyester was made from four molecular equivalents of triethylene glycol and three molecular equivalents of dimethylmalonic acid diethylester. The product was dissolved in dry benzene and two molecular equivalents of 2,4-tolylenediisocyanate was added.

The product was valuable as a textile finishing agent, an adhesive and a protective coating. For example, a nylon fabric was padded with 2% of the product, by weight. After curing at 110° C. for 30 minutes, the fabric had an improved hand and improved resistance to static electrification. Repeated laundering did not remove the finish by hydrolysis. A similar finish made with adipic acid in place of dimethylmalonic acid was deteriorated after 2 or 3 launderings.

In addition to the examples specifically set forth above, it is apparent that a great number of variations and modifications can be accomplished in accordance with the techniques in using other materials well known in the art.

Although the invention has been described in considerable detail with reference to certain preferred embodiments thereof, it will be understood that variations and modifications can be affected without departing from the spirit and scope of the invention as described hereinabove and as defined in the appended claims.

I claim:

1. In a process for preparing a polyester-urethane made by the following general procedure comprising (A) reacting together at least the following ingredients (1) a liquid polyester of at least one dicarboxylic compound containing at least 3 carbon atoms and at least one glycol, said polyester having a hydroxyl number of from 30 to 140 and an acid number of from 0 to 15 and a weight average molecular weight of from about 700 to about 3500, and (2) at least one organic polyisocyanate, comprising at least 50 mole percent of an organic diisocyanate the equivalents of said polyester based on its hydroxyl content to the equivalents of said polyisocyanate being at least about 0.85 and not more than about 5, said reacting being accomplished with agitation and (B) curing the reaction mixture in a shape according to the space in which it is contained at about 50°–140° C., the improvement consisting of employing as at least 50 mole percent of said dicarboxylic compound, a 2,2-dialkylmalonic compound wherein each alkyl radical contains from 1 to 4 carbon atoms.

2. A process as defined by claim 1 wherein a further improvement consists of employing, as at least 50 mole percent of said glycol, a glycol having at least one ether moiety in its structure and having a maximum molecular weight of about 2000.

3. A process as defined by claim 2 wherein said dicarboxylic compound is diethyl 2,2-dimethylmalonate, said glycol is triethylene glycol and said polyisocyanate is 2,4-tolylenediisocyanate.

4. A process as defined by claim 3 wherein the reaction mixture prepared in (A) is dissolved in benzene and applied to a textile fabric prior to curing (B) whereby said benzene is evaporated.

5. In a process for preparing an elastomeric polyester-urethane made by the following general procedure comprising (A) reacting together at least the following ingredients (1) a liquid polyester of at least one dicarboxylic compound containing at least 3 carbon atoms and at least one glycol, said polyester having a hydroxyl number of from 30 to 140 and an acid number of from 0 to 15 and a weight average molecular weight of from about 700 to about 3500, and (2) at least one organic polyisocyanate, comprising at least 50 mole percent of an organic diisocyanate, the equivalents of said polyester based on its hydroxyl content to the equivalents of said polyisocyanate being from about 0.85 to about 1.10, said reacting being accomplished with agitation for a short period of time, and (B) curing the reaction mixture in a shape according to tthe space in which it is contained at about 50°–140° C., the improvement consisting of employing as at least 50 mole percent of said dicarboxylic compound, a 2,2-dialkylmalonic compound wherein each alkyl radical contains from 1 to 4 carbon atoms.

6. A process as defined by claim 5 wherein a further improvement consists of employing, as at least 50 mole percent of said glycol, a glycol having at least one ether moiety in its structure and having a maximum molecular weight of about 2000.

7. A process as defined by claim 6 wherein said dicarboxylic compound is diethyl 2,2-dimethylmalonate, said glycol is diethylene glycol, and said polyisocyanate is m-tolylenediisocyanate.

8. A process as defined by claim 5 wherein said dicarboxylic compound is diethyl 2-ethyl-2-methylmalonate, said glycol is pentamethylene and said polyisocyanate is 1,6-hexamethylenediisocyanate.

9. In a process for preparing polyester-urethane foam made by the following general procedure comprising (A) reacting together at least the following ingredients (1) a liquid polyester of at least one dicarboxylic compound containing at least 3 carbon atoms and at least one glycol, said polyester having a hydroxyl number of from 30 to 140 and an acid number of from 0 to 15 and a weight average molecular weight of from about 700 to about 3500, (2) at least one organic polyisocyanate, comprising at least 50 mole percent of an organic diisocyanate, the equivalents of said polyester based on its hydroxyl content to said polyisocyanate being from about 2.5 to 5.0 and (3) water, there being from 0.8 to 1.5 equivalents of water for each equivalent of said polyisocyanate in excess of the equivalents of said polyester, said reacting of (1), (2) and (3) being accomplished with agitation for a short period in the presence of an emulsifier composition so as to form a foamed liquid, (B) allowing the foamed liquid reaction mixture to form a solid foamed product shaped according to a space in which it is contained, and (C) curing the foamed product at 50°–100° C., the improvement consisting of employing, as at least 50 mole percent of said dicarboxylic compound, a 2,2-dialkylmalonic compound wherein each alkyl radical contains from 1 to 4 carbon atoms.

10. A process as defined by claim 9 wherein a further improvement consists of employing, as at least 50 mole percent of said glycol, a glycol having at least one ether moiety in its structure and having a maximum molecular weight of about 2000.

11. A process as defined by claim 10 wherein said dicarboxylic compound is dimethyl 2-ethyl-2-butylmalonate and said glycol is 4,4'-oxydibutanol.

12. A polyester-urethane produced by the process defined by claim 1.

13. A polyester-urethane produced by the process defined by claim 3.

14. A polyester-urethane produced by the process defined by claim 7.

15. A polyester-urethane produced by the process defined by claim 8.

16. A polyester-urethane produced by the process defined by claim 10.

17. A textile fabric coated with a polyester-urethane produced by the process defined by claim 4.

References Cited in the file of this patent

UNITED STATES PATENTS

| | | |
|---|---|---|
| 2,483,726 | Floyd | Oct. 4, 1949 |
| 2,764,565 | Hoppe et al. | Sept. 25, 1956 |